United States Patent [19]

Scott et al.

[11] Patent Number: 5,137,100

[45] Date of Patent: Aug. 11, 1992

[54] HYDROSTATIC TRANSMISSIONS

[75] Inventors: Graham Scott, Westerville, Ohio;
Graham J. Toogood, Cheltenham, England

[73] Assignee: Ultra Hydraulics Limited, Cheltenham, England

[21] Appl. No.: 642,218

[22] Filed: Jan. 16, 1991

Related U.S. Application Data

[63] Continuation-in-part of Ser. No. 600,823, Oct. 22, 1990.

[51] Int. Cl.⁵ .............................................. B62D 11/00
[52] U.S. Cl. ........................ 180/6.48; 56/DIG. 11;
60/428; 180/19.1; 180/19.3; 180/53.4; 180/242;
180/305; 180/307; 180/308
[58] Field of Search ................ 180/6.48, 19.1, 19.2,
180/19.3, 242, 305, 306, 307, 308, 53.1, 53.4;
60/384, 421, 428; 56/10.6, 10.8, 10.9, 11.4, 11.9,
13.6, DIG. 11

[56] References Cited

U.S. PATENT DOCUMENTS

| | | | |
|---|---|---|---|
| 2,766,834 | 10/1956 | Boyer | 180/6.48 |
| 3,024,858 | 3/1962 | Davis et al. | 180/19.2 |
| 3,279,637 | 10/1966 | Olson et al. | 180/6.48 |
| 3,422,917 | 1/1969 | Guinot | 60/421 |
| 3,656,570 | 4/1972 | Gortnar et al. | 180/6.48 |
| 3,916,767 | 11/1975 | Barton | 180/6.48 |
| 4,355,693 | 10/1982 | Hirooka et al. | 180/6.48 |
| 4,804,016 | 2/1989 | Novacek et al. | 60/384 |

FOREIGN PATENT DOCUMENTS 23636 8/1965 Japan ......................... 180/6.48

Primary Examiner—Mitchell J. Hill
Attorney, Agent, or Firm—Young & Thompson

[57] ABSTRACT

A hydrostatic transmission for a vehicle, such as a commercial walk-behind mower, comprises a fixed displacement pump, first and second reversible hydraulic motors for driving first and second ground engageable wheels, respectively, of the vehicle, and first and second spool valves for controlling hydraulic fluid flow from the fixed displacement hydraulic pump to the first and second hydraulic motors, respectively. The transmission may have a further fixed displacement hydraulic pump arranged in tandem with the first mentioned pump, a fluid pressure operated device and a third spool valve movable between a first position in which hydraulic fluid from the further pump is supplied to the pressure operated device and a second position in which hydraulic fluid from the further pump is supplied to the first and second spool valves to supplement hydraulic fluid from the first mentioned hydraulic pump.

7 Claims, 2 Drawing Sheets

1

HYDROSTATIC TRANSMISSIONS

RELATED APPLICATION

This is a continuation-in-part of Ser. No. 07/600,823 filed Oct. 22, 1990 pending.

INTRODUCTION

This invention relates to a hydrostatic transmission for a vehicle, such as a commercial walk-behind mower.

It is known to provide commercial walk-behind mowers with a hydrostatic transmission between the mower's engine and its driven wheels. The known transmissions make use of two variable displacement pumps to drive hydraulic motors connected, respectively, to two driven wheels of the mower. The mower is driven in a straight line when the fluid flow from the two pumps is equal and is steered by adjusting the pumps so that the fluid flow therefrom is different. These known hydrostatic transmissions are expensive because of the high cost of variable displacement hydraulic pumps. Also, it is usual to drive the mower blade by a belt drive directly from the engine. This is often extremely inconvenient because of the need to align engine and blade pulleys.

It is therefore an object of this invention to provide a hydrostatic transmission in an improved form.

SUMMARY OF THE INVENTION

According to one aspect of the present invention there is provided a hydrostatic transmission for a vehicle, comprising a fixed displacement hydraulic pump, first and second reversible hydraulic motors for driving first and second ground engageable wheels, respectively, of the vehicle, and first and second valve means for controlling hydraulic fluid flow from the fixed displacement hydraulic pump to the first and second hydraulic motors, respectively, whereby in use the two motors will be driven at the same rotational speed when the fluid flow to the two motors is equal to drive the vehicle along a straight line path and will be driven at different rotational speeds when the fluid flow to the two motors is different to steer the vehicle.

Preferably, the hydrostatic transmission further comprises a load sensing relief valve to unload excess flow from the pump.

Conveniently, each of the first and second valve is in the form of spool valve, which may have a pressure compensating valve connected to its inlet so that for a given spool position the spool valve will pass a given flow regardless of the pressure demand on it.

Conveniently, the first and second hydraulic motors are in the form of gerotor motors.

According to another aspect of the present invention, there is provided a vehicle having a prime mover, two driven ground engageable wheels and a hydrostatic transmission connecting the prime mover to the two wheels, the hydrostatic transmission comprising a fixed displacement hydraulic pump connected to the prime mover, first and second reversible hydraulic motors connected to the two wheels, respectively, and first and second valve means for controlling hydraulic fluid flow from the fixed displacement hydraulic pump to the first and second hydraulic motors, respectively, whereby in use the two motors will be driven at the same rotational speed when the fluid flow to the two motors is equal to drive the vehicle along a straight line path and will be driven at different rotational speeds when the fluid flow to the two motors is different to steer the vehicle.

According to yet another aspect of the present invention, there is provided a hydrostatic transmission for a vehicle, comprising first and second fixed displacement hydraulic pumps, first and second reversible hydraulic motors for driving first and second ground engageable wheels, respectively, of the vehicle, a fluid pressure operated device, first and second valve means for controlling hydraulic fluid flow from the first fixed displacement hydraulic pump to the first and second hydraulic motors, respectively, whereby in use the two motors will be driven at the same rotational speed when the fluid flow to the two motors is equal to drive the vehicle along a straight line path and will be driven at different rotational speeds when the fluid flow to the two motors is different to steer the vehicle, and third valve means movable between a first position in which in use hydraulic fluid from the second hydraulic pump is supplied to the fluid pressure operated device and a second position in which in use hydraulic fluid from the second hydraulic pump supplements hydraulic fluid supplied to the motors from the first hydraulic pump.

Preferably, the hydrostatic transmission further comprises a load sensing relief valve to unload excess flow from the first hydraulic pump, and also excess flow from the second hydraulic pump when the third valve means is in said second position.

Conveniently, the fluid pressure operated device comprises at least one further hydraulic motor which may, for example, be used to drive a mower blade or blades.

Advantageously, the first and second hydraulic pumps are arranged in tandem.

Conveniently, the first, second and third valve means are in the form of spool valves, and each of the first and second spool valves may have a pressure compensating valve connected to its inlet so that for a given spool position the spool valve will pass a given flow regardless of the pressure demand on it.

Conveniently, the first and second hydraulic motors are in the form of gerotor motors.

According to a still further aspect of the invention, there is provided a vehicle having a prime mover, two driven ground engageable wheels, a power driven device on the vehicle, and a hydrostatic transmission connecting the prime mover to the two wheels and the power driven device, the hydrostatic transmission comprising first and second fixed displacement hydraulic pumps connected to the prime mover, first and second reversible hydraulic motors connected to the two wheels, respectively, a fluid pressure operated device connected to the power driven device, first and second valve means for controlling hydraulic fluid from the first fixed displacement hydraulic pump to the first and second hydraulic motors, respectively, whereby in use the two motors will be driven at the same rotational speed when the fluid flow to the two motors is equal to drive the vehicle along a straight line path and will be driven at different rotational speeds when the fluid flow to the two motors is different to steer the vehicle, and third valve means movable between a first position in which hydraulic fluid from the second hydraulic pump is supplied to the fluid pressure operated device and a second position in which hydraulic fluid from the second hydraulic pump supplements hydraulic fluid supplied to the motors from the first hydraulic pump.

Preferably, the power operated device is a mower blade and the fluid pressure operated device is a further hydraulic motor for driving the mower blade.

The invention will now be more particularly described, by way of example, with reference to the accompanying drawings.

DESCRIPTION OF THE PREFERRED EMBODIMENTS

Figure 1:
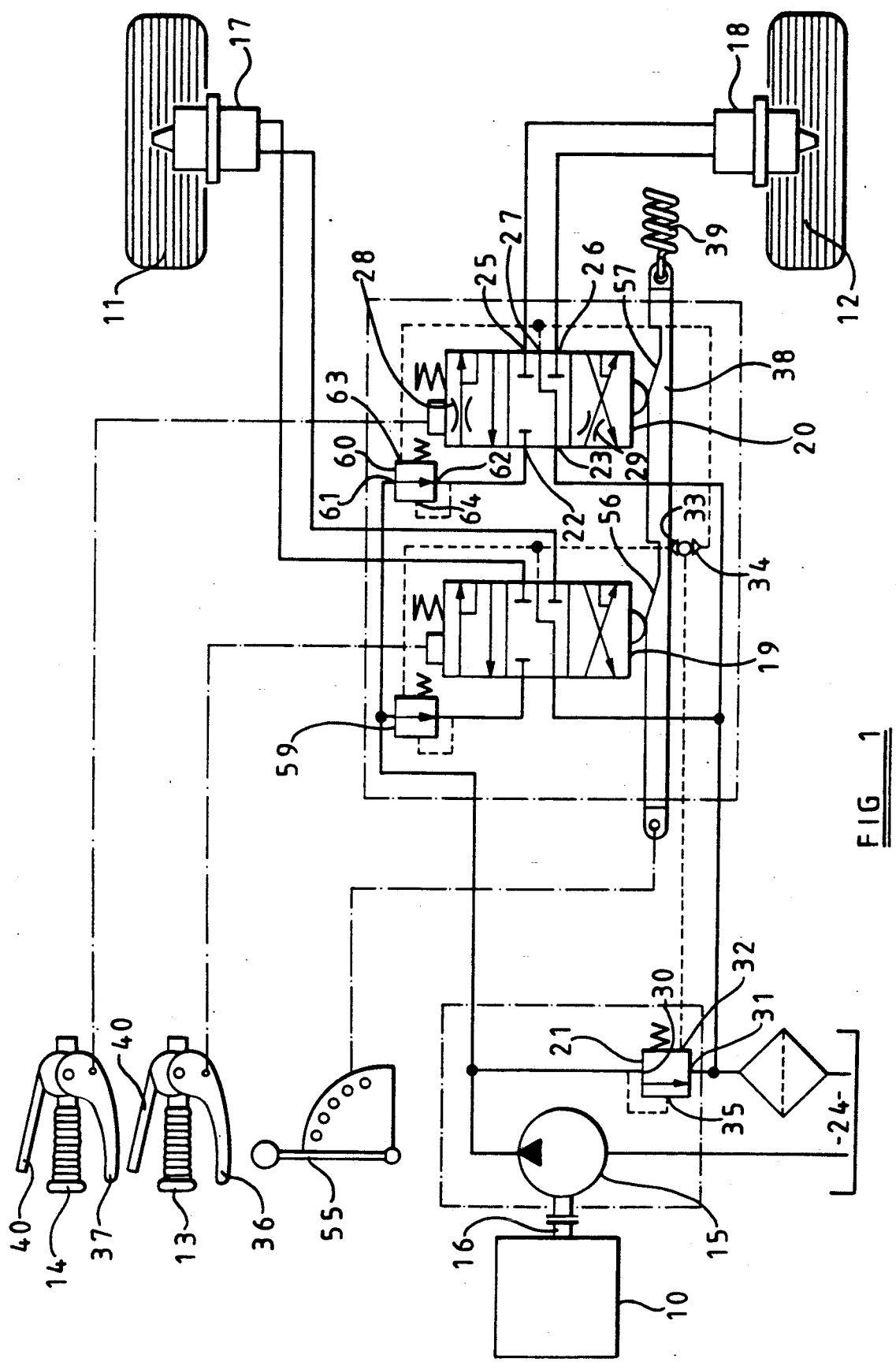
FIG. 1 is an hydraulic circuit diagram of one embodiment of a hydrostatic transmission according to the present invention.

Referring firstly to FIG. 1 of the drawings, there is shown therein a hydrostatic transmission for a commercial walk-behind mower. The mower has an internal combustion engine 10, two driven ground engaging wheels 11 and 12, and hand grips 13 and 14 at the rear of the mower.

The hydrostatic transmission comprises a single fixed displacement hydraulic pump 15 connected to the driven shaft 16 of the engine 10, two hydraulic motors 17 and 18 connected to the two wheels 11 and 12, respectively, two flow control valves 19 and 20, and a load sensing relief valve 21.

The pump 15 is typically in the form of a rotary gear pump and the motors 17 and 18 are typically in the form of gerotor motors.

The valves 19 and 20 control fluid flow from the pump 15 to the two motors 17 and 18, respectively. These valves 19 and 20 are in the form of spool valves having associated pressure compensating valves 59 and 60, respectively, and are of identical construction. Therefore, only valve 20 and its associated pressure compensating valve 60 will be described in detail.

The valve 20 has an inlet port 22 connected to the supply line from the pump 15 via the pressure compensating valve 60, a return port 23 connected to an hydraulic fluid reservoir 24, two ports 25 and 26 connected to the motor 18 and a load sensing port 27. The spool of valve 20 is shown in a central position and when in this position the spool will block fluid flow both to port 25 and port 26. Therefore, there will be no fluid flow to the motor 18. If the spool is moved in one direction, inlet port 22 will be connected to port 25 via a variable orifice 28 which increases as the spool moves further from its central position, and port 26 will be connected to return port 23. The motor 18 will rotate to drive the wheel 12 in a forwards direction. If the spool is moved in the opposite direction from its central position, inlet port 22 will be connected to port 26 via a variable orifice 29 which increases as the spool moves further from its central position, and port 25 will be connected to return port 23. The motor 18 will rotate to drive the wheel 12 in a rearwards direction.

The load sensing relief valve 21 has an inlet port 30 connected to the supply line from the pump 15 and an outlet port 31 connected to the reservoir 24. The relief valve 21 also has a load sensing port 32 connected to the load sensing ports 27 of the valves 19 and 20 via non-return valves 33 and 34, respectively, and a further port 35 connected to the inlet port 30. The load sensing ports 27 communicate with the fluid pressure downstream of the variable orifices 28, 29 when the valves 19, 20 are in other than central positions, and the non-return valves 33, 34 communicate the higher of the pressures at the load sensing ports 27 of the valves 19 and 20 with the load sensing port 32 of the relief valve 21.

The valve 21 is fully open when the differential pressure between the ports 32 and 35 is at a maximum, i.e. when the pump 15 is supplying fluid and the valves 19 and 20 are in respective central positions to block fluid flow to the motors 17 and 18. As one or both valves 19 and 20 open, the pressure at the load sensing port 32 will increase as one or other variable orifice 28, 29 in the or each valve 19, 20 increases, and the valve 21 begins to close so that less fluid is returned to the reservoir 24. When both valves 19 and 20 are fully open, the differential pressure between the ports 32 and 35 of the valve 21 is substantially zero and the valve 21 closes so ensuring that the entire output of the pump 15 is delivered to the motors 17 and 18.

Valve 60 is a conventional pressure compensating valve. It has an inlet port 61 connected to the supply line from the pump 15, an outlet port 62 connected to the inlet port 22 of the spool valve 20, a load sensing port 63 connected to the load sensing port 27 of the spool valve 20, and a further port 64 connected to its outlet port 62.

The pressure compensating valves 59 and 60 are provided to prevent one or other of the motors 17 and 18 drawing all of the flow from the pump 15 in the event that, for example, one of the wheels 11, 12 begins to slip, and ensure that each motor 17, 18 can only draw the flow selected for it regardless of the torque on the motor. The pressure compensating valves 59 and 60 thus ensure that each spool valve 19, 20 will pass a given flow for a given spool position regardless of the pressure demand on it.

Control levers 36 and 37 are mounted on hand grips 13 and 14, respectively, for operating the valves 19 and 20. By manipulating the levers 36 and 37, it is possible to control the rotational speed and direction of rotation of each motor 17, 18 so as to regulate the ground speed of the mower and alter its direction of travel. Indeed, if desired one motor could be driven in a forwards direction and the other in reverse in order to cause the mower to make a tight turn.

A locking device and speed limiter 38 is provided to lock the valves 19 and 20 in respective central positions and cut off fluid flow to the motors 17 and 18. The locking device 38 is urged by a spring 39 to a locking position and is disengaged by a control lever 55. As shown, the locking device 38 also has two ramps 56 and 57 which co-operate with the spool valves 19 and 20, respectively, when the control lever 55 is in one of a number of available intermediate positions to act as speed limiters.

Each hand grip 13, 14 is provided with a dead man lever 40 connected to the engine 10. If both levers 40 are released by an operator, the engine 10 will cut out to prevent an accident The load sensing relief valve 21 is mounted close to the pump 15 and the valves 19, 20, 59 and 60 are formed as a monobloc, i.e. in the same body.

In the embodiment described above, the mower blade or blades (not shown) are driven in conventional manner by a belt drive between the engine 10 and the blade(s).

Figure 2:
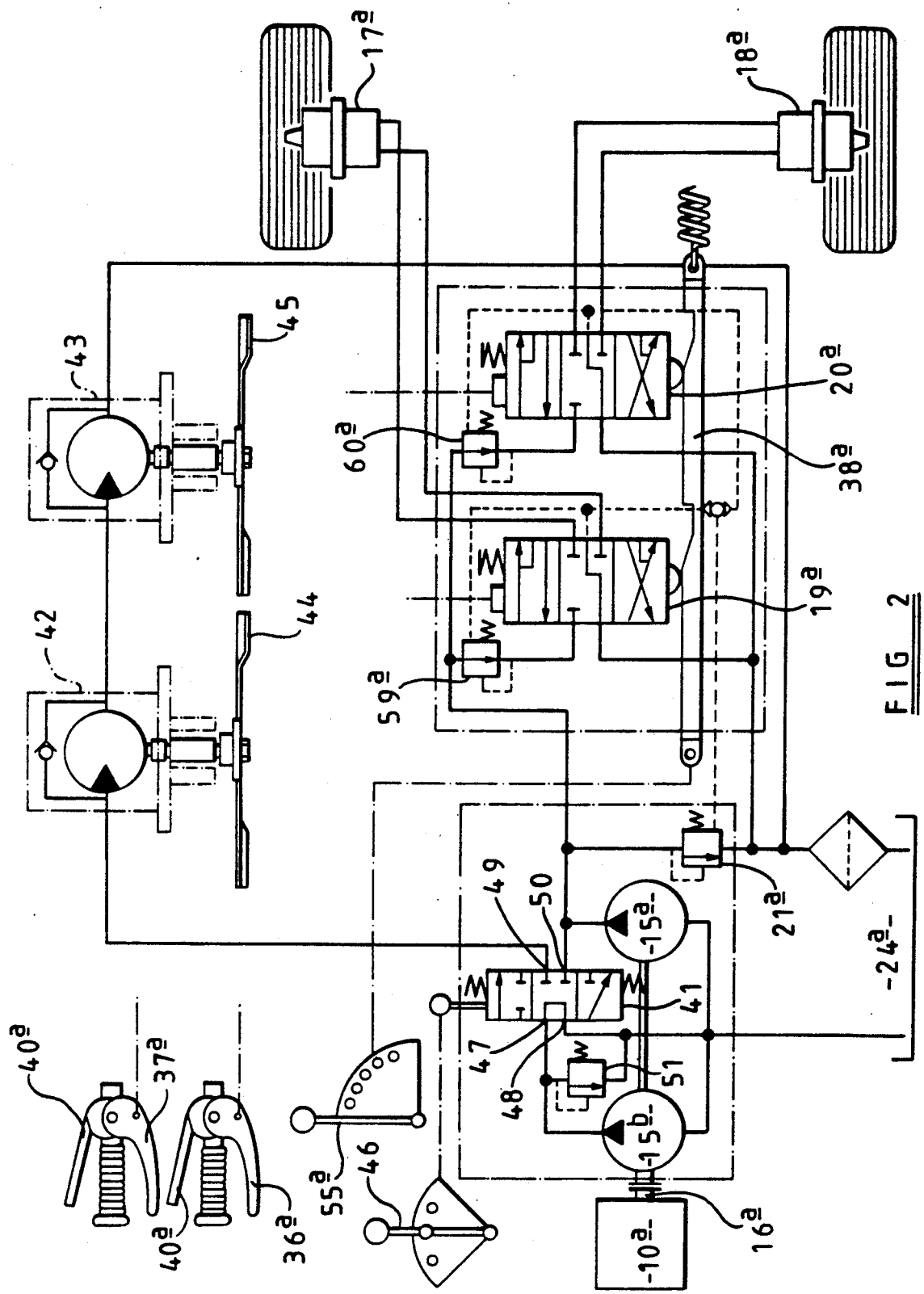
FIG. 2 is an hydraulic circuit diagram of another embodiment of an hydrostatic transmission according to the present invention.

However, FIG. 2 shows a hydrostatic transmission which drives mower blades as well as the ground engaging wheels of the mower.

The hydrostatic transmission shown in FIG. 2 comprises two fixed displacement hydraulic pumps 15a and 15b, typically gear pumps, connected in tandem to the driven shaft 16a of the engine 10a, two hydraulic motors 17a and 18a connected to driven wheels 11a and 12a, respectively, first and second flow control valves 19a and 20a having associated pressure compensating valves 59a and 60a, and a load sensing relief valve 21a.

Pump 15a supplies fluid to the motors 17a and 18a via the compensating valves 59a and 60a and the valves 19a and 20a, and valves 19a and 20a are operated by control levers 36a and 37a all in the manner described with reference to the embodiment of FIG. 1.

The transmission of FIG. 2 has a further or third valve 41 and two further hydraulic motors 42 and 43, which in this case are typically gear motors, for rotating two mower blades 44 and 45, respectively.

The valve 41 is a three position spool valve operated by a control lever 46. The valve 41 has an inlet port 47 connected to the pump 15b, a return port 48 connected to hydraulic fluid reservoir 24a, a port 49 connected to the motors 42 and 43, and a port 50 connected to the inlet ports of the two compensating valves 59a and 60a.

A pressure relief valve 51 is provided between the supply line from pump 15b and the fluid reservoir 24a.

When the spool of valve 41 is in a central position, inlet port 47 is connected directly to return port 48 and the pump 15b circulates fluid to and from the reservoir 24a. When the spool of valve 41 is moved in one direction (downwards from the position shown in FIG. 2), inlet port 47 is connected to port 49 and the pump 15b supplies fluid to the motors 42 and 43 to drive the mower blades 44 and 45, respectively. When the spool of valve 41 is moved in an opposite direction from its central position (upwards from the position shown in FIG. 2), inlet port 47 is connected to port 50 so that the pump 15b supplies fluid to the inlet ports 22a of the two valves 19a and 20a to supplement the fluid supplied by the pump 15a, and the port 49 is connected to the return port 48 to drain fluid from the motors 42 and 43 to the reservoir 24a.

Thus, the mower can be driven across the ground at a much higher speed when not performing a mowing operation.

In this embodiment, the load sensing relief valve 21a will unload excess flow from pump 15a in the manner described previously and also excess fluid from the pump 15b when this pump supplements the fluid supplied by the pump 15a.

The transmission shown in FIG. 2 also has a locking device and speed limiter 38a operated by a control lever 55a, and dead man levers 40a.

The valves 41 and 51 are mounted adjacent to the pumps 15a and 15b and the valves 19a, 20a, 59a and 60a are formed as a monobloc.

The two motors 42 and 43 could be replaced by a single motor driving the two mower blades 44 and 45 via a belt drive.

The three position spool valve 41 could be replaced by a two position spool valve which in one position circulates fluid to and from the pump 15b and in the other position connects the pump 15b to the motors 42 and 43. In this case, there is no provision for pump 15b to supplement the pump 15a.

The above embodiments are given by way of example only and various modifications will be apparent to persons skilled in the art without departing from the scope of the invention defined by the appended claims.

What is claimed is:

1. A hydrostatic transmission for a vehicle, comprising first and second fixed displacement hydraulic pumps, first and second reversible hydraulic motors for driving first and second ground engageable wheels, respectively, of the vehicle, a fluid pressure operated device, first and second value means for controlling hydraulic fluid flow from the first fixed displacement hydraulic pump to the first and second hydraulic motors, respectively, whereby in use the two motors will be driven at the same rotational speed when the fluid flow to the two motors is equal to drive the vehicle along a straight line path and will be driven at different rotational speeds when the fluid flow to the two motors is different to steer the vehicle, each of said first and second valve means having an inlet port and a pressure-compensated valve between said inlet port and said first fixed displacement hydraulic pump, third valve means movable between a first position in which in use hydraulic fluid from the second hydraulic pump is supplied to the fluid pressure operated device and a second position in which in use hydraulic fluid from the second hydraulic pump supplements hydraulic fluid supplied to the motors from the first hydraulic pump, and a load sensing relief valve for unloading excess flow from the first hydraulic pump and also excess fluid flow from the second hydraulic pump when the third valve means is in said second position.

2. A hydrostatic transmission as claimed in claim 1, wherein the third valve means is movable to a third position in which hydraulic fluid from the second hydraulic pump is returned to drain.

3. A hydrostatic transmission as claimed in claim 1, wherein the fluid pressure operated device comprises at least one further hydraulic motor.

4. A hydrostatic transmission as claimed in claim 1, wherein the first and second hydraulic pumps are arranged in tandem.

5. A hydrostatic transmission as claimed in claim 1, wherein the first, second and third valve means are in the form of spool valves.

6. A vehicle having a prime mover, two driven ground engageable wheels, a power driven device on the vehicle, and a hydrostatic transmission connecting the prime mover to the two wheels and the power driven device, the hydrostatic transmission comprising first and second fixed displacement hydraulic pumps connected to the prime mover, first and second reversible hydraulic motors connected to the two wheels, respectively, a fluid pressure operated device connected to the power driven device to drive the power driven device, first and second valve means for controlling hydraulic fluid from the first fixed displacement hydraulic pump to the first and second hydraulic motors, respectively, whereby in use the two motors will be driven at the same rotational speed when the fluid flow to the two motors is equal to drive the vehicle along a straight line path and will be driven at different rotational speeds when the fluid flow to the two motors is different to steer the vehicle, each of said first and second valve means having an inlet port and a pressure-compensated valve between said inlet port and said first fixed displacement hydraulic pump, third valve means movable between a first position in which in use hydraulic fluid from the second hydraulic pump is supplied to the fluid pressure operated device and a second position in which in use hydraulic fluid from the second hydraulic pump supplements hydraulic fluid supplied to the motors from the first hydraulic pump, and a load sensing relief valve for unloading excess flow from the first hydraulic pump and also excess fluid flow from the second hydraulic pump when the third valve means is in said second position.

7. A vehicle as claimed in claim 6, wherein the power operated device is a mower blade and the fluid pressure operated device is a further hydraulic motor for driving the mower blade.

* * * * *